United States Patent [19]

Di Filippo et al.

[11] Patent Number: 5,266,614
[45] Date of Patent: Nov. 30, 1993

[54] CORROSION RESISTANT COATING FORMED FROM A PETROLEUM COKE AND EPOXY RESIN COMPOSITION

[75] Inventors: Giuseppe Di Filippo, La Boyera; Ricardo L. P. Pocaterra, Edal, both of Venezuela

[73] Assignee: Intevep, S.A., Caracas, Venezuela

[21] Appl. No.: 499,999

[22] Filed: Mar. 27, 1990

[51] Int. Cl.$^5$ .......................... C08J 5/10; C08K 3/04; C08L 95/00

[52] U.S. Cl. ........................ 524/63; 523/450; 523/466

[58] Field of Search ................... 523/450, 466; 524/63

[56] References Cited

U.S. PATENT DOCUMENTS 2,765,288  10/1956  Whittier et al. .................... 523/450
4,499,215   2/1985  Okada ................................ 523/450

Primary Examiner—Paul R. Michl
Assistant Examiner—U. K. Rajguru
Attorney, Agent, or Firm—Bachman & LaPointe

[57] ABSTRACT

A novel organic coating to be used on metal surfaces as a protective barrier against corrosion is described. The coating comprises a base component formed from epoxy resin, petroleum coke, magnesium silicate, a solvent, and optionally a thixotropic agent and/or coal tar and a catalyst component preferably selected from the group consisting of polyamide resins and an amine. The coating of the present invention has a highly enhanced hardness and excellent abrasion resistance properties. A method of preparing a liquid paint-like material to be applied to a metal substrate to form the coating of the present invention is also described.

19 Claims, 5 Drawing Sheets

CORROSION RESISTANT COATING FORMED FROM A PETROLEUM COKE AND EPOXY RESIN COMPOSITION

BACKGROUND OF THE INVENTION

The present invention relates to a novel organic coating to be used on metal surfaces as a protective barrier against corrosion and a method of preparing a paint-like material to be applied to a metal surface to form said coating.

Several attempts have been made to obtain anticorrosive coatings for pipes and tanks from high viscosity components present in natural hydrocarbons. An example of this is the commercial epoxy tar coating systems, whose use dates back to the 1950's. U.S. Pat. No. 2,765,288 to Pittsburgh Coke and Chemical Co. describes one such epoxy tar coating system. In general, these coatings are formulated from coal tar, epoxy resin, solvents, additives and curing agents of the amine or polyamide types. The coatings generally constitute an effective physical and mechanical barrier. Some of them may be used jointly with cathodic protection systems.

U.S. Pat. Nos. 4,162,998 and 4,499,215 display other coatings in which a modified asphalt is used with an epoxy resin. These coatings feature good impermeability and rust-resistance and can be obtained from economical raw materials. However, in order for the asphalt to be resin-compatible, its chemical nature must be modified by means of complex chemical processes. In Japanese patent application J9075664-A and J77003679-B, a third component consisting of coal dust is added to the base formulation, thus resulting in a coating with properties similar to the ones above-mentioned.

It is an object of the present invention to provide a coating which can be used on metal surfaces as a protective barrier against corrosion.

It is further object of the present invention to provide an organic coating as above which is competitive with commercial tar coatings.

It is yet a further object of the present invention to provide a coating as above which may be used in a wide range of applications and may be easily applied.

It is still another object of the present invention to provide a coating as above with highly enhanced hardness and abrasion-resistance properties and a method of preparing a paint-like material for forming said coating.

Still further objects and advantages will become apparent from the following description and drawings.

SUMMARY OF THE INVENTION

The foregoing objects and advantages are readily attained by the novel organic coating of the present invention. The coating is developed from epoxy resin and petroleum coke. It may be applied to a wide variety of metal surfaces subject to a wide variety of conditions. For example, it may be applied to pipes exposed to sea environment, underground tubing with or without cathodic protection, heated multi-conduits, storage tank bottoms, other storage tank surfaces to be protected, field-welded joint to be protected, and installed-line repairs.

The coating comprises a base component formulated from 100 parts of epoxy resin, from about 25 to about 150 parts of petroleum coke per 100 parts of epoxy resin, from about 25 to about 100 parts of magnesium silicate per each 100 parts of epoxy resin, from about 15% to about 30% by weight of a solvent and optionally from about 1% to about 2% by weight of a thixotropic agent. The base component may further contain up to about 25 parts of coal tar per 100 parts of epoxy resin to improve the uniformity of the coating film while reducing the number of pores and microholes and/or up to 2 parts of 2, 4, 6-tridimethylaminoacetylphenol per 100 parts of epoxy resin as an accelerator for promoting curing.

The coating may further include a catalyst component for curing the base component. The catalyst component may comprise either a polyamide resin or an amine such as diethylentriamine. When used, the catalyst is present in a ratio of base component to catalyst component in the range of from about 3:1 to about 28:1.

The coating may be formed on a metal surface using any suitable technique known in the art. For example, it may be applied to the metal surface by spraying or rolling a paint-like material on the surface. This paint-like material may be prepared by forming the base component and mixing it with the catalyst component just prior to the material application. It is important for the base component and the catalyst to be separated prior to use and separately packaged so as to prevent a premature curing and solidification of the base component.

The base component is preferably formed by first dissolving the epoxy resin in a preparation including a solvent and any thixotropic agent. Thereafter, the petroleum coke and the magnesium silicate are added to the preparation. Preferably, both are in powder form and added by means of mechanical dispersion. The preparation is then stirred for a time period in the range of from about 15 minutes to about 25 minutes.

If necessary, the viscosity of the preparation may be adjusted by adding additional solvent. Typically, the preparation will have a viscosity in the range of from about 150 cP to about 600 cP measured at 22° C. in a brookfield viscometer at 10 rpm. The viscosity referred to above corresponds to the viscosity of the formulations. This viscosity changes during application of the product.

If either coal tar or an accelerator is to be added to the base component, they can be added either at the same time the petroleum coke is added or later.

Further details of the coating, its properties and method of preparing the paint-like material will be discussed hereinafter. It should be noted however that the coatings of the present invention are characterized by highly enhanced hardness and abrasion-resistance properties.

DETAILED DESCRIPTION

The anticorrosive coatings of the present invention are characterized by the distinctive use of petroleum coke as a primary active ingredient. It has been found that the hardness and abrasion resistance of the coatings are enhanced by the presence of petroleum coke. This is because the petroleum coke is a solid feedstock which provides the coating with greater physical stability.

The coatings of the present invention include a base coating whose chemical composition consists essentially of 100 parts of epoxy resin, from about 25 to about 150 parts of petroleum coke per 100 parts of epoxy resin, from about 25 to about 100 parts of magnesium silicate per 100 parts of epoxy resin, up to about 25 parts of coal tar per 100 parts of epoxy resin, from about 15% to about 30% by weight of a solvent, and optionally, from about 1.0 to about 2.0% by weight of a thixotropic agent.

Figure 1:
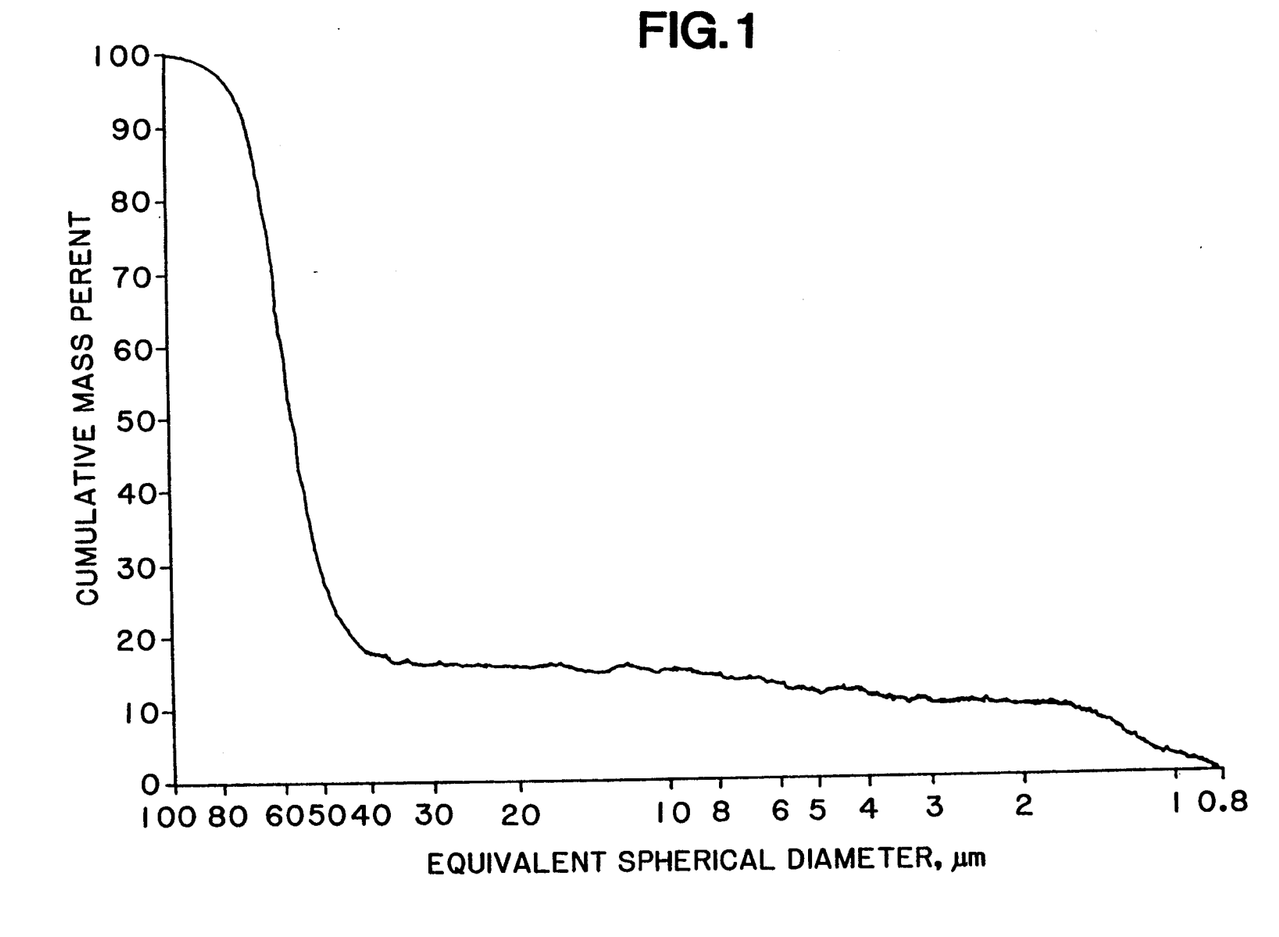
FIG. 1 is a graph showing the particle size distribution of coke.

As previously discussed, the petroleum coke in the base component serves to enhance the hardness and abrasion-resistance properties of the coating. This is because petroleum coke is a solid feedstock which provides the coating with a greater physical stability. The petroleum coke may be of the bed-coke type such as that from the Amuay refinery in the state of Falcon, Venezuela. FIG. 1 shows the particle size distribution of petroleum coke as screened with 100 mesh. It has been found that for an optimal dispersion of the coke in the epoxy resin and for improving the ability of the material to be applied to a metal surface in the form of a paint, the coke should have an average particle size less than about 50 $\mu$m. The coke may be ground to a desired particle using any suitable means known in the art such as a ball mill.

Figure 2:
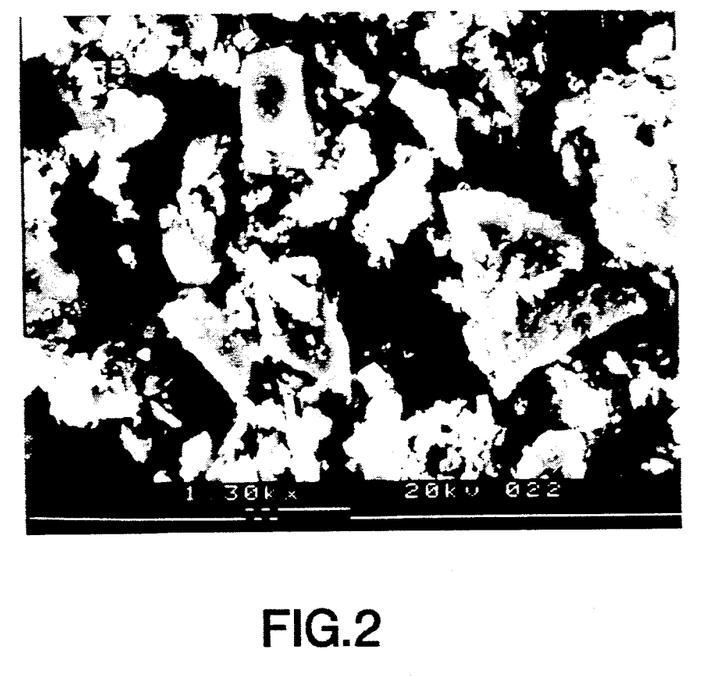
FIG. 2 is a photograph obtained by scanning electron microscopy of epoxy-coke particles not included in an epoxy matrix.

FIG. 2 shows the morphology and particle size of petroleum coke having an average particle size less than 20 $\mu$m. Small sized particles are critical for obtaining a good coating. The small particle size allows for superior compaction on the metal and thus less holes in the coating.

It has been found that screening the petroleum coke particles with a 100 mesh helps form a better dispersion of coke dust in the epoxy resin and a coating film with greater uniformity and continuity. It has also been found that unburnt petroleum coke has an electrical resistivity that ranges from 30,000 to 105,000 ohms/cm. Therefore, it is possible to obtain a coating with excellent electrical resistivity and which can act as a good electrical barrier. As a result, the coating of the present invention may be used together with cathodic protection systems.

Traces of sodium, cobalt, vanadium, sulfur and chlorides are frequently present in petroleum coke at impurity levels. It has been found however that the presence of these elements does not influence the performance of the coatings of the present invention.

The epoxy resin used in the base component may be a diepoxidated condensation polymer obtained from bisphenol A and epichlorohydrin having terminal epoxy groups. The specifications for a suitable resin are provided in Table I.

TABLE I

| PROPERTY | MAGNITUDE |
| --- | --- |
| Non-volatile material (%) by weight | 75–85 |
| Viscosity (Gardner) | R–Y |
| Color (Gardner) | 9 (max.) |
| Physical state | liquid |
| Appearance | translucid |
| Specific weight (at 25° C.) | 1.09–1.13 |
| Weight per volume (lb/gallon) | 9.07–9.56 |
| Acidity index (mg, KOH/gr) | 0.5 (max) |
| Epoxy equivalent (number of epoxy groups in a resin molecule) | 230–280 |

The magnesium silicate in the base component is an inert feedstock material. It acts as a physical barrier against electrolyte penetration. Preferably, it has a refining by "refining" is meant the degree of fineness of the magnesium silicate of at least 5 degrees Hegman, a weight per volume (density) in the range of 22.4 to 26.9 lb/gallon and a settling rate of 10/5, 15/10 and 40/30 ml/min. The density is important in order to control the suspension of the magnesium silicate in the mixture as well as the time the particle stay in suspension, i.e., settling rate. One suitable magnesium silicate which can be used in the base component is Pinco powder from Pittsburg Co.

The thixotropic agent optionally used in the formulation of the base component may be an agent based on silica gels such as that sold under the trademark AEROSIL by Montana de Venezuela. Its function is to modify the rheological behavior of the paint-like material in order to facilitate its application.

The solvent used in the base component may be an epoxy resin-compatible solvent selected from the group consisting of tetrahydrofuran, methylethylketone, ethylene glycol monobutyl ether, sec-butyl alcohol, xylene, n-butyl alcohol, and mixtures thereof.

The coal tar which is added, if any, is a combination of complex molecules resulting from the condensation of at least thirty aromatic hydrocarbons obtained by destructive distillation of mineral charcoal at about 700° C. Specifications for a suitable tar to be used in the base component are given in Standard SSP6, Paint 16. The coal tar has been found to improve the uniformity of the coating film while reducing the number of pores and microholes. As a result, the capability of the coating to act as a physical barrier is increased. The coal tar is added to the base component preferably at a low ratio since it is a viscous liquid which increases the plasticity of the base component and reduces hardness and abrasion resistance.

The coating of the present invention may also include a catalyst component for curing the base component. Suitable catalysts include those of the amine or polyamide types such as diethylentriamine or a polyamide resin having an amino index, that is the number of amino groups, in the range of from about 230 to about 246.

It has been found that polyamide resin catalysts produce a polyamide epoxy resin whose curing agent is a high-viscosity polyamide or the product of the condensation of a polyamide dimerized fatty acid. Typical properties for such a catalyst appear in Table II.

TABLE II

| PROPERTY | MAGNITUDE |
| --- | --- |
| Non-volatile material (%) by weight | 98–100 |
| Color (Gardner) | 12 (max.) |
| Physical state | solid |
| Appearance | translucid |
| Specific weight (at 25° C.) | 0.92–0.98 |
| Weight per volume (lb/gallon) | 7.70–8.15 |

TABLE II-continued

| PROPERTY | MAGNITUDE |
| --- | --- |
| Amino index* | 230–246 |

*Determined by ASTM 2094 standard.

For optimal curing, the stoichiometric ratio of epoxy resin to polyamide resin should be in the range of from about 1.2:1 to about 1.4:1. When a polyamide catalyst is used, 2, 4, 6-tridimethylaminoacetylphenol at up to about 2 parts per 100 parts of epoxy resin should be added to the base component as an accelerator so as to optimize curing at ambient temperature.

The second type of catalyst, or amine catalyst, may consist of diethylentriamine. Its characteristics are shown in Table III.

TABLE III

| PROPERTY | MAGNITUDE |
| --- | --- |
| Refractive index | 1.482–1.486 |
| Color (Gardner) | 2 (max.) |
| Specific weight (25° C.) | 0.953–0.985 |
| Viscosity (Brookfield cps) | 7–30 |
| pH at 10% in H2O | 11–12.5 |
| Weight per volume (lb/gallon) | 7.92–8.26 |
| Amino index* | 1500–1600 |

*Determined by ASTM 2094 (Standard).

For optimal curing, the stoichiometric ratio of epoxy resin to amine catalyst should be in the range of from about 11:1 to about 13:1.

The physical and chemical-atmospheric properties of typical coatings having using the aforementioned base and catalyst components are set forth in Table IV.

TABLE IV

| PROPERTY | MAGNITUDE |
| --- | --- |
| Thickness (μm) | 200–500 |
| Specific gravity | 1.2–1.8 |
| Shore hardness | 45–60 |
| Impact resistance (ft.-lb per inch) | 4–10 |
| Water absorption (%) | 1.8–2.3 |
| Electrical resistance (K ohms) | 280–1500 |
| Cathode emission: | |
| 1.5 volts 25° C. | 1.0–3.5 |
| 3.0 volts 25° C. | 1.5–4.0 |
| 1.5 volts 65° C. | 2.5–7.0 |
| 3.0 volts 65° C. | 3.5–8.0 |
| (30 days 1% Na2SO4 | |
| 1% Na2CO3 | |
| 1% NaCl) | |
| Salt cloud solution | No corrosion |
| | Coating with little or no swelling |
| Hot-water dipping | No apparent change |
| (1500 hours, 100° C.) | |
| Resistance to chemicals | Coating resistance to NaCl 10% by wt., crude and gasoline attack. Susceptible to HCl 10% by wt., Na 10% by wt.; and methylethylketone. |

Figure 3A:
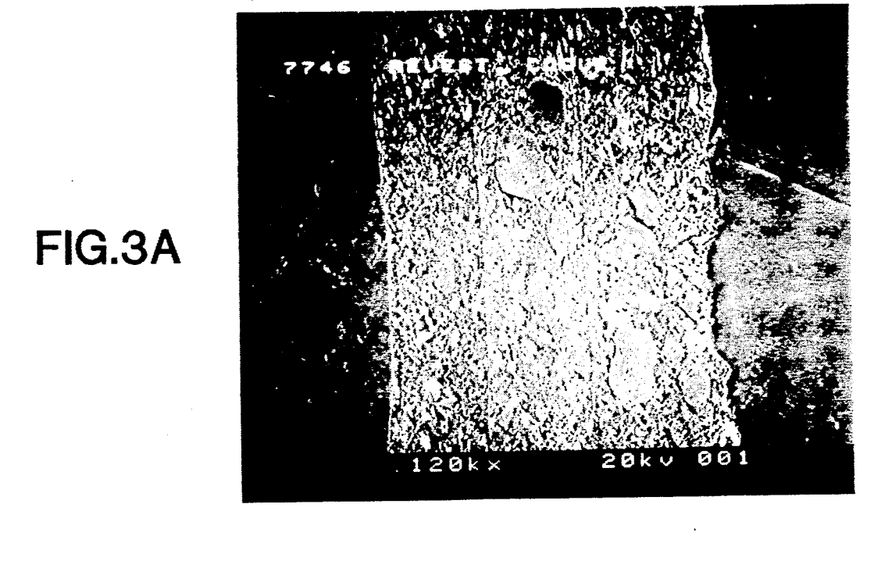
FIGS. 3a and 3b are photographs obtained by scanning electron microscopy of a cross-section of a coating in accordance with the present invention.
Figure 3B:
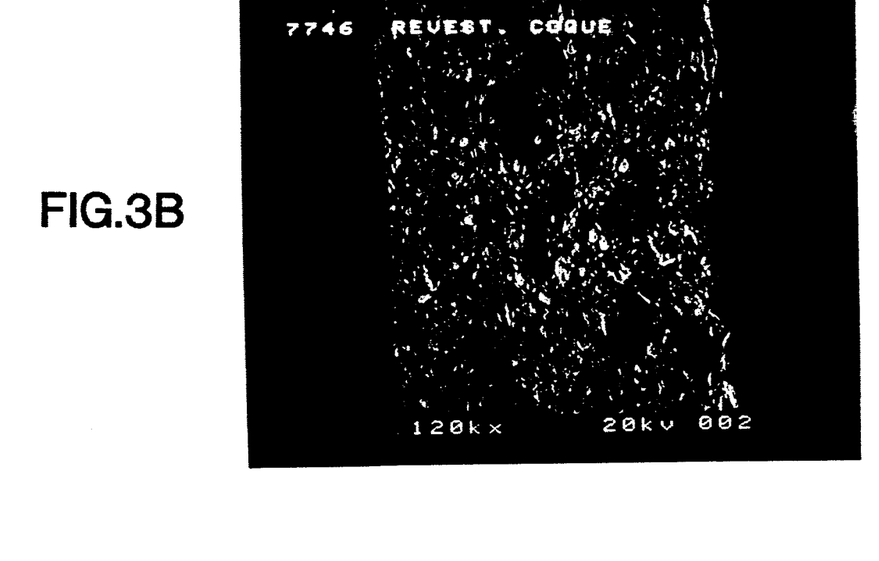

FIGS. 3a and 3b show microphotographs obtained by electron microscopy of a cross-section of a coating film in accordance with the present invention applied to a carbon steel substrate illustrating the fine quality of the coating to the substrate.

As previously discussed, it is desirable to apply the coating to the metal substrate in a manner conventional to the application of paint. Typical metal substrates include carbon steel, stainless steel and other ferrous metals. To facilitate the application of the coating, the base component is prepared into a liquid paint-like material in the following manner.

The epoxy resin in an amount of 100 grams is dissolved in a preparation containing 30 to 70 grams of solvent and up to 2 grams of the thixotropic agent. After dissolution is completed, 50 grams petroleum coke and 25 to 50 grams of magnesium silicate, both in powder form, are added to the preparation. Preferably, they are added gradually using a mechanical dispersion technique such as a mechanical agitator. If coal tar is needed, it is added with the petroleum coke and magnesium silicate.

The preparation is then stirred for a time period in the range of from about 15 minutes to about 25 minutes until an optimal dispersion of the constituents is obtained. If needed the viscosity of the base component may be adjusted to a value in the range of from about 158 cP to about 6000 cP at 22° C. in a brookfield viscometer at 10 rpm by adding an amount of solvent sufficient to adjust the viscosity to the desired level.

After the paint-like material is prepared, it may be stored in a container or cask. It has been found to be desirable to store the base component and catalyst component in separate containers to avoid premature curing until they are to be mixed just prior to application to a metal surface. 6-trimethylaminoacetilphenol is added to the base-catalyst mixture prior to application. When applied, the paint-like material should contain a ratio of base component to catalyst component in the range of from about 3:1 to about 28:1 in order to insure optimum curing rate and therefore good coating properties.

It has been found that the base component should be mixed with the catalyst component with an induction time of about 15 minutes to form a paint-like material. This paint-like material may be applied to metals such as carbon steel substrates, other ferrous alloys, and the like.

Prior to applying the paint-like material, the metal substrate should be cleaned for example to a minimum commercial gray index of SS PC-6 with a surface roughness of 1.5 mils minimum for carbon steel substrates.

If necessary, the viscosity of the paint-like material may be adjusted according to the type of application chosen by varying the amount of solvent in the system.

After the paint-like material has been applied to the metal surface, the coating thus formed generally takes about 4–8 hours to dry. After drying is completed, a second coat may be added if desired.

Typical properties of the paint-like material are shown in Table V.

TABLE V

| PROPERTY | VALUE |
| --- | --- |
| Non-volatile material (percent by weight) | 60–75 |
| Specific gravity | 1.1–1.4 |
| Drying time (hours) | 4–8 |
| Performance Kg/m2 (amount of paint per substrate area) | 0.8–1.2 |
| Time it remains stable in container (months) | 5–7 |

Figure 4A:
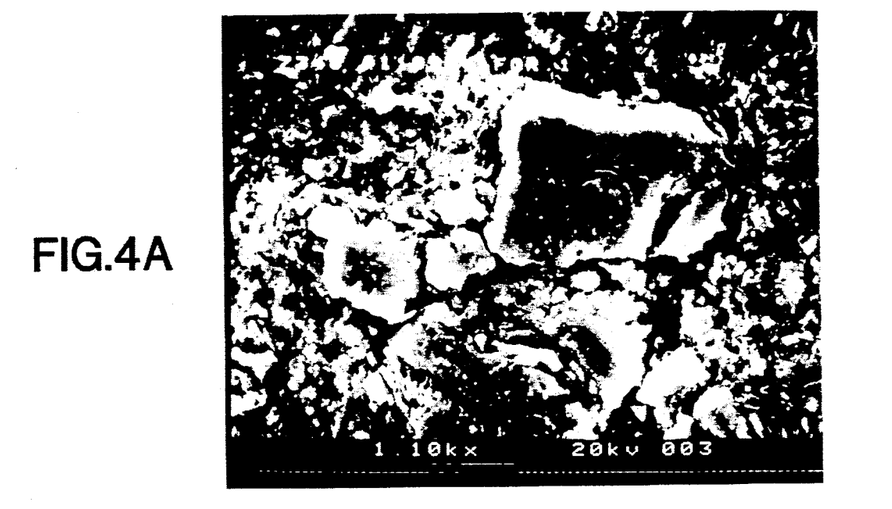
FIGS. 4a and 4b are photographs obtained by scanning electron microscopy of a cross-section of a coating in accordance with the present invention showing its morphology.
Figure 4B:
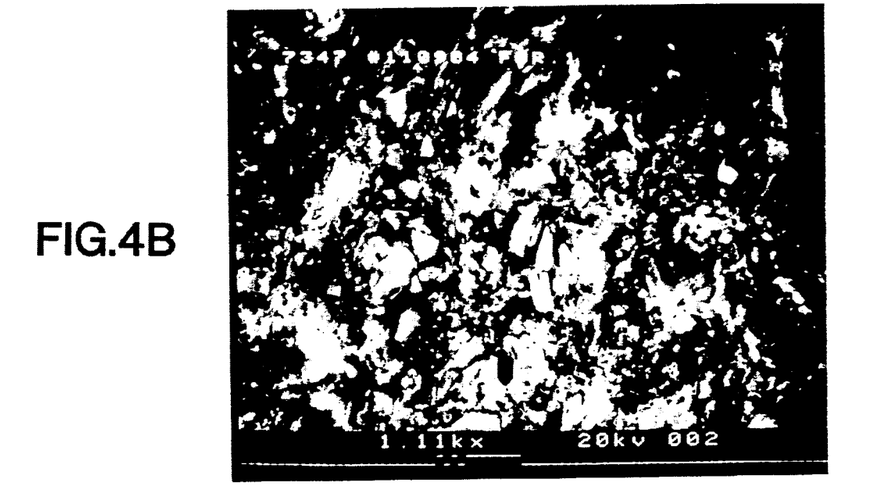
Figure 4C:
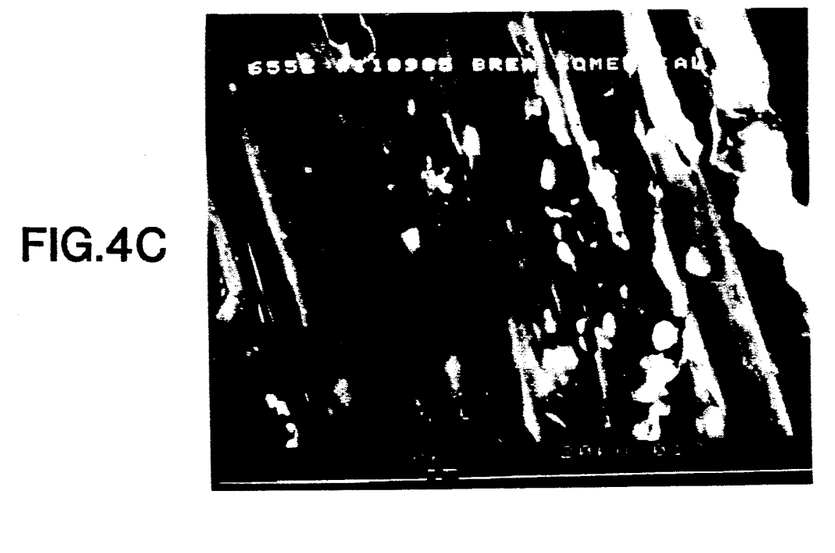
FIGS. 4c and 4d are photographs obtained by scanning electron microscopy of a commercial epoxy tar coating cross-section showing its morphology.
Figure 4D:
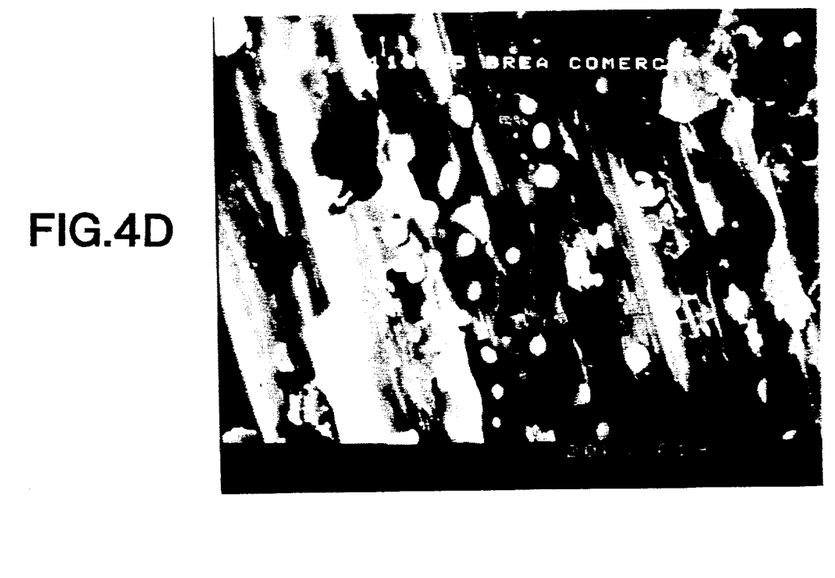

FIGS. 4a and 4b are photomicrographs of a coating in accordance with the present invention showing its morphology. FIGS. 4c and 4d show the morphology of a coating formed from a commercially available epoxy tar. As can be seen from these photographs, the morphology of the coating of the present invention is excellent.

To demonstrate the utility of the coatings of the present invention, a series of tests were conducted. In each test, a coating was applied to a carbon steel substrate. Prior to applying the coating, the metal substrate was cleaned at a minimum commercial gray index of SS PC-6 with an anchorage profile of 1.5 mils min.

The components of the base component were prepared into a liquid paint-like material using the methodology described hereinabove. Mixing of the formulation components occurred with an induction time of about 15 minutes. The catalyst component was mixed with the base component just prior to the paint-like material being applied to the substrate.

The paint-like material was applied to the metal substrate using a conventional spray-gun. A first coat of about 7 mils thickness was applied and allowed to dry. After drying, a second coat was applied. There was a service time of 7 days upon complete application prior to introduction of the part into service.

Methodologies used to evaluate the properties of the coating of the present invention and its components are listed in Table VI.

TABLE VI

| PROPERTY | MAGNITUDE |
| --- | --- |
| Specific gravity | ASTM D 981-86 |
| Non-volatile material content | ASTM D 2369-86 |
| Drying time | INTA 160229 |
| Performance | INTA 160261 |
| Coating thickness | ASTMG 12-83 |
| Impact resistance | ASTMG 14-83 |
| Salt cloud | ASTMB 117-73 |
| Water absorption | ASTMD 570-81 |
| Chemical resistance | ASTMD 543-84 |
| Hot-water dipping | INTA 160601 |
| Cathode emission | ASTM G8-85 |

EXAMPLE I

A liquid paint-like material was applied to a carbon steel surface as outlined above. The paint-like material was formed from the following constituents:

| BASE COMPONENT | (gr) | CATALYST COMPONENT |
| --- | --- | --- |
| Epoxy resin (epoxy equiv. 230-280) | 100 | Diethylentriamine |
| Petroleum coke | 50 | |
| Solvent (30:70 xylene: 1-butenol) | 54 | |
| Magnesium silicate | 25 | |

The ratio of base component to catalyst component was 28:1.

The properties of the resulting coating were as follows:

| PHYSICAL-CHEMICAL PROPERTIES: | |
| --- | --- |
| Coating thickness | 12 ± 2 mils |
| Specific gravity | 1.24 |
| Shore hardness | 51 |
| Impact resistance | 5 ft-lb per inch |
| Flexion | >32° |
| CHEMICAL-ATMOSPHERIC PROPERTIES: | |
| Water absorption | 2.1% |
| Salt cloud | Coating in good condition |
| Chemical resistance | HCL, NaCl, crude and gasoline-resistant |
| Hot-water dipping | slight discoloration |
| ELECTRO-CHEMICAL PROPERTIES: | |
| Electrical resistance | 1500K ohms |
| Cathode emission: | |
| 1.5 volts 25° C. | 2.2 cm |
| 3.0 volts 25° C. | 1.6 slight swelling |
| 1.5 volts 65° C. | 5.3 cm |
| 3.0 volts 65° C. | Coating failure |

The paint-like material applied to the metal substrate was found to have the following properties:

| | |
| --- | --- |
| Non-volatile material percentage | 71.27% |
| Specific gravity | 1.1250 |
| Repainting drying time | 4 hours |
| Performance | 0.867 Kg/m |
| Stability in container | 6 months min. |

EXAMPLE II

A liquid paint-like material was applied to a carbon steel substrate as in Example I. The paint-like material was formed from the following constituents:

| BASE COMPONENT | (gr) | CATALYST COMPONENT |
| --- | --- | --- |
| Epoxy resin (epoxy equiv. 230-280) | 100 | Polyamide resin (amino index 230-246) |
| Petroleum coke | 50 | |
| Solvent (30:70 xylene: 1-butenol) | 54 | |
| Magnesium silicate | 50 | |
| Tridimethylamino-acetylphenol | 2 | |

The ratio of base component to catalyst component was 3:1.

The properties of the resulting coating were as follows:

| PHYSICAL-CHEMICAL PROPERTIES: | |
| --- | --- |
| Coating thickness | 9.5 ± 1 mils |
| Specific gravity | 1.29 |
| Shore hardness | 50 |
| Impact resistance | 8 ft-lb per inch |
| Flexion | >32° |
| CHEMICAL-ATMOSPHERIC PROPERTIES: | |
| Water absorption | 1.8% |
| Salt cloud | Coating in good condition. Slight tear at incision point. |
| Chemical resistance | HCL, NaCl, crude and gasoline-resistant. Susceptible to NaOH and MEK attack. |
| Hot-water dipping | No apparent change. |
| ELECTRO-CHEMICAL PROPERTIES: | |
| Electrical resistance | 1100K ohms |
| Cathode emission: | |
| 1.5 volts 25° C. | 3.5 cm |
| 3.0 volts 25° C. | 2.2 cm slight swelling |
| 1.5 volts 65° C. | 2.5 cm |
| 3.0 volts 65° C. | 3.5 cm slight swelling |

The paint-like material applied to the metal substrate was found to have the following properties:

| | |
|---|---|
| Non-volatile material percentage | 62.81% |
| Specific gravity | 1.1376 |
| Repainting drying time | 4 hours |
| Performance | 0.904 Kg/m |
| Stability in container | 6 months min. |

EXAMPLE III

A liquid paint-like material was applied to a carbon steel substrate as in Example I. The paint-like material was formed from the following constituents:

| BASE COMPONENT | (gr) | CATALYST COMPONENT |
|---|---|---|
| Epoxy resin (epoxy equiv. 230–280) | 100 | Diethylentriamine |
| Petroleum coke | 50 | |
| Solvent (30:70 xylene: 1-butenol) | 30 | |
| Magnesium silicate | 25 | |

The ratio of base component to catalyst component was 28:1.

The properties of the resulting coating were as follows:

| PHYSICAL-CHEMICAL PROPERTIES: | |
|---|---|
| Coating thickness | 8 ± 2 mils |
| Specific gravity | 1.75 |
| Shore hardness | 50 |
| Impact resistance | 5 ft-lb per inch |
| Flexion | >32° |
| CHEMICAL-ATMOSPHERIC PROPERTIES: | |
| Water absorption | 1.9% |
| Salt cloud | Slight swelling |
| Chemical resistance | NaCl, crude and gasoline-resistant. Susceptible to NaOH, HCl and MEK attack. |
| Hot-water dipping | Slight swelling |
| ELECTRO-CHEMICAL PROPERTIES: | |
| Electrical resistance | 280K ohms |
| Cathode emission: | |
| 1.5 volts 25° C. | Swelling |
| 3.0 volts 25° C. | Swelling |
| 1.5 volts 65° C. | Coating fault |
| 3.0 volts 65° C. | Coating fault |

The paint-like material applied to the metal substrate was found to have the following properties:

| | |
|---|---|
| Non-volatile material percentage | 71.27% |
| Specific gravity | 1.3250 |
| Repainting drying time | 4 hours |
| Performance | 1.134 kg/m |
| Stability in container | 6 months min. |

EXAMPLE IV

A liquid paint-like material was applied to a carbon steel substrate as in Example I. The paint-like material was formed from the following constituents:

| BASE COMPONENT | (gr) | CATALYST COMPONENT |
|---|---|---|
| Epoxy resin (epoxy equiv. 230–280) | 100 | Polyamide resin (amino index 230–246) |
| Petroleum coke | 50 | |
| Solvent (30:70 xylene: 1-butenol) | 68 | |
| Magnesium silicate | 50 | |
| Coal tar | 25 | |
| Tridimethylamino-acetylphenol | 2 | |
| Thixotropic Agent | 4 | |

The ratio of base component to catalyst component was 4:1.

The properties of the resulting coating was as follows:

| PHYSICAL-CHEMICAL PROPERTIES: | |
|---|---|
| Coating thickness | 8.9 ± 1.2 mils |
| Specific gravity | 1.64 |
| Shore hardness | 45 |
| Impact resistance | 4 ft-lb per inch |
| Flexion | >32° |
| CHEMICAL-ATMOSPHERIC PROPERTIES: | |
| Water absorption | 2.3% |
| Salt cloud | Coating in good conditions. |
| Chemical resistance | NaCl, HCl, crude and gasoline-resistant. Susceptible to NaOH, and MEK attack. |
| Hot-water dipping | No apparent change. |
| ELECTRO-CHEMICAL PROPERTIES: | |
| Electrical resistance | 1200K ohms |
| Cathode emission: | |
| 1.5 volts 25° C. | 1.6 |
| 3.0 volts 25° C. | 2.5 |
| 1.5 volts 65° C. | 2.8 |
| 3.0 volts 65° C. | 4.5 |

The paint-like material applied to the metal substrate was found to have the following properties:

| | |
|---|---|
| Non-volatile material percentage | 69.13% |
| Specific gravity | 1.2318 |
| Repainting drying time | 4 hours |
| Performance | 0.745 Kg/m |
| Stability in container | 6 months min. |

As can be seen from the foregoing examples, the coatings of the present invention have excellent hardness and abrasion resistance properties.

It is apparent that there has been provided in accordance with this invention a corrosion resistant coating formed from a petroleum coke and an epoxy resin composition and a method for preparing the composition which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An anticorrosive coating for protecting a metal surface which comprises a base component formulated from 100 parts of epoxy resin, from about 25 to 150 parts of petroleum coke per 100 parts of epoxy resin wherein the particle size of the petroleum coke is less than about 50 microns and is characterized by an electrical resistivity of from 30,000 to 105,000 ohms/cm, from about 25 to about 100 parts of magnesium silicate per each 100 parts of epoxy resin, and from about 25 to about 150 parts of a solvent.

2. The coating of claim 1 wherein said base component contains up to about 25 parts of coal tar per 100 parts of epoxy resin.

3. The coating of claim 1 wherein said base component contains from about 1.75 to about 10.2 parts of a thixotropic agent.

4. The coating of claim 3 wherein said thixotropic agent comprises a silica gel.

5. The coating of claim 1 wherein said solvent is epoxy-resin compatible and selected from the group consisting of tetrhydrofuran, methylethylketone, ethylene glycol monobutyl ether, sec-butyl alcohol, xylene, n-butyl alcohol, and mixtures thereof.

6. The coating of claim 1 further comprising:
   a catalyst component for curing said base component; and
   said catalyst component being mixed with said base component at the moment said coating is applied to said metal surface in a ratio base component to catalyst in the range of about 3:1 to about 28:1.

7. The coating of claim 6 wherein said catalyst is selected from the group consisting of a polyamide resin and an amino.

8. The coating of claim 1 wherein said base components further contains up to about 2 parts of 2, 4, 6- tridimethylaminoacetylphenol per 100 parts of epoxy resin as an accelerator for promoting curing.

9. The coating of claim 1 wherein said coating has a Shore hardness in the range of about 45–60 and an impact resistance in the range of from about 4 to about 10 ft-lb per inch.

10. A method for preparing a paint-like material to be applied to a metal surface to form an anticorrosive coating thereon, said method comprising:
    forming a base component for said paint-like material containing 100 parts of epoxy resin wherein the particle size of the petroleum coke is less than about 50 microns and is characterized by an electrical resistivity of from 30,000 to 105,000 ohms/cm, from about 25 to about 150 parts of petroleum coke per 100 parts of epoxy resin, from about 25 to about 100 parts of magnesium silicate per each 100 parts of epoxy resin, and from about 1.75 to about 10.2 parts of a solvent; and
    mixing said base component with a catalyst in an amount sufficient to cure said base component.

11. The method of claim 10 wherein said base component forming step comprises:
    dissolving said epoxy resin in a preparation of said solvent and an optional thixotropic agent;
    adding said petroleum coke and said magnesium silicate to said preparation with said dissolved epoxy resin by means of mechanical dispersion; and
    stirring said preparation for a time period in the range of from about 15 minutes to about 25 minutes.

12. The method of claim 11 wherein said base component forming step further comprising adjusting the viscosity of the preparation to a value in the range of from about 150 cP to about 6000 cP by adding from said solvent to said preparation.

13. The method of claim 10 further comprising:
    storing said base component and catalyst in separate containers prior to said mixing step while maintaining a ratio of base component to catalyst in the range of from about 3:1 to about 28:1.

14. The method of claim 11 wherein said adding step further comprises adding up to about 25 parts of coal tar per 100 parts of epoxy resin to said preparation.

15. The method of claim 10 wherein said mixing step comprises mixing said base component and said catalyst at the moment they are applied to said metal surface.

16. The method of claim 10 wherein said mixing step comprises mixing said base component with a catalyst material selected from a group consisting of a polyamide resin and an amine.

17. The method of claim 10 wherein said mixing step comprises mixing said base component with said catalyst material with an induction time in the range of from about 13 minutes to about 17 minutes.

18. The method of claim 10 further comprising:
    adding up to about 2 parts of 2, 4, 6 tridimethylaminoacetylphenol per 100 parts of epoxy resin in said base component as a curing accelerator.

19. The method of claim 10 wherein said base component forming step comprises forming said base component with from about 1.75 to about 10.2 parts of a thixotropic agent.

* * * * *